UNITED STATES PATENT OFFICE.

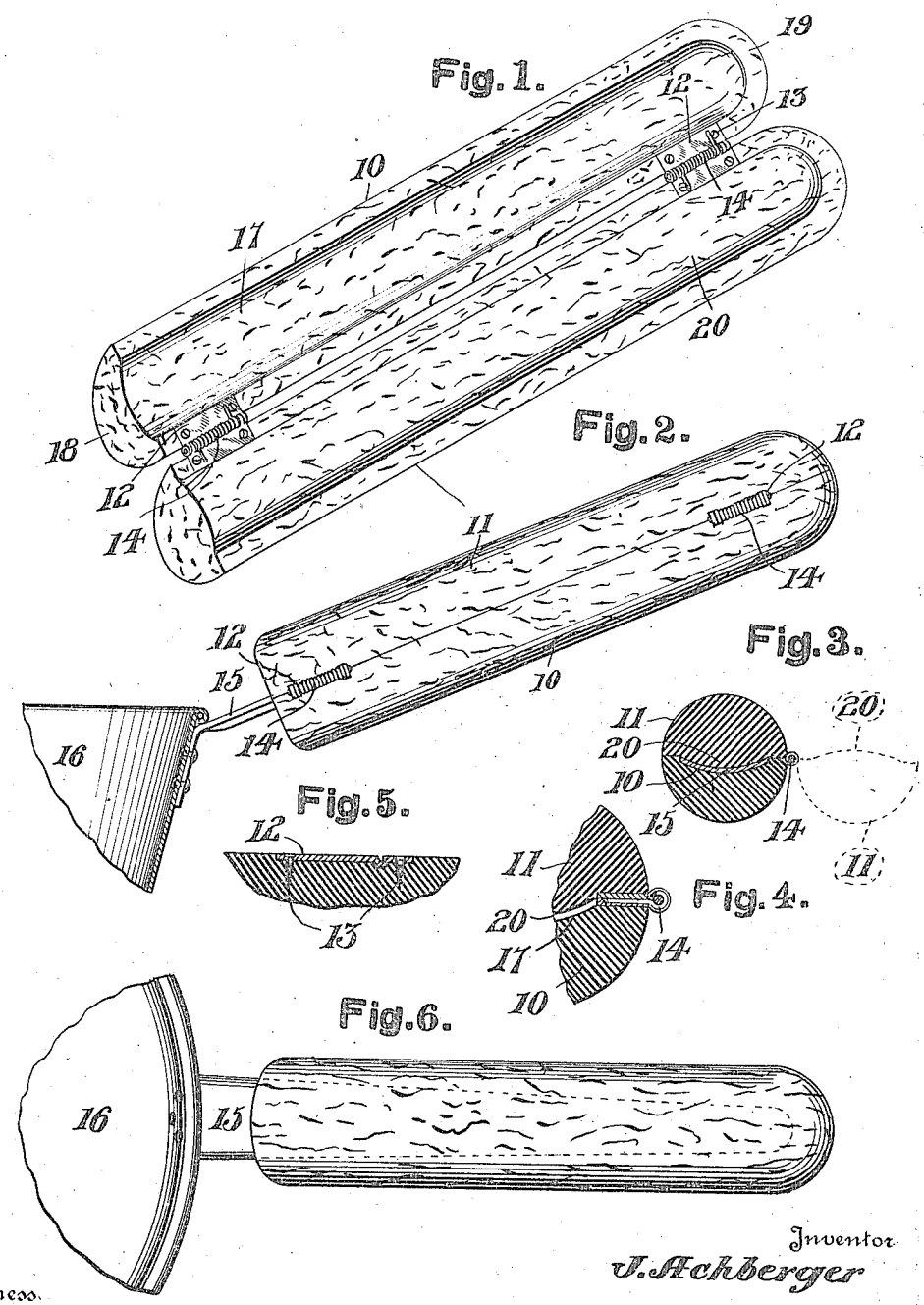

JOZEF ACHBERGER, OF MIDDLETOWN, OHIO.

INSULATED UTENSIL-HANDLE.

1,162,896. Specification of Letters Patent. Patented Dec. 7, 1915.

Application filed March 4, 1915. Serial No. 12,026.

*To all whom it may concern:*

Be it known that I, JOZEF ACHBERGER, a subject of the King of Hungary, residing at Middletown, in the county of Butler and State of Ohio, have invented certain new and useful Improvements in Insulated Utensil-Handles, of which the following is a specification.

This invention relates to new and useful improvements in insulated utensil handles.

The primary object of this invention is the provision of a portable handle readily applied to the usual handle of a utensil for the purpose of insulating the same against heat and allowing the operator to lift and move the utensil without being burned or inconvenienced by reason of the high temperature of the utensil handle.

A further object is to provide an auxiliary handle formed of heat insulating material and designed to be grasped for inclosing the hot handle of a cooking utensil during the lifting or moving operation on the part of the person in charge of such utensil.

A still further object is to provide a device which is cheap and easy to manufacture and which is serviceably convenient as an auxiliary heat insulated handle for cooking and other utensils.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a perspective view of the device in its normal open position and detached from the utensil. Fig. 2 is a side elevation thereof positioned for use upon the handle of a utensil. Fig. 3 is a transverse sectional view through the device as shown in Fig. 2 but with one portion of the device shown in dotted lines in its open position. Fig. 4 is an enlarged detail transverse sectional view through the hinged portion of the device as closed. Fig. 5 is an enlarged detail longitudinal sectional view through one of the spring leaves of the device, and Fig. 6 is a top plan view of a modified form of insulating handle fixedly mounted upon the utensil handle.

Referring more in detail to the drawings, the entire invention consisting of an auxiliary handle, it will be noted that the same includes two sections 10 and 11 each being substantially semi-circular in cross section and formed of heat insulating material such as cork or fiber. The said sections 10 and 11 are hingedly connected together by means of suitable hinges 12 secured to the two sections by means of screws 13, each of the hinges being provided with a spring 14 that normally maintains the hinges in their open positions and with the handle sections separated from each other as best illustrated in Fig. 1 of the drawings. The auxiliary handle so formed is designed for engagement with the usual metallic handle 15 of a utensil such as 16 and for this purpose, the section 10 has a longitudinal groove 17 arcuate in cross-section opening at the squared base end 18 of the section and closed at the curved opposite end 19 thereof, it being designed to position the utensil handle 15 within the said groove 17. The coöperating handle section 11 is provided with a substantially complemental longitudinally positioned arcuate rib 20 which is adapted to engage the opposite side of the handle 15 and being opposed to the groove 17, the utensil handle is seated within the said groove and engaged by the said rib when the device is closed upon the utensil handle by the hand of the operator in the grasping operation, as clearly indicated in Fig. 3. It will thus be seen that the sections 10 and 11 are normally open but that the device may be readily grasped in the hand and forced to its closed position inclosing the heated utensil handle therein and in which position the utensil may be readily lifted or carried as may be desired without burning or heating the hand of the operator. When the auxiliary handle is placed in position, it is obvious that the same may be retained upon the utensil handle by means of an elastic band or other device which is not herein shown, but that the invention contemplates the ordinary use of the device as retained in position only when grasped by the hand and as being automatically opened for releasing the same from the utensil handle upon freeing the grasp of the operator.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. A device of the class described comprising handle sections formed of heat insulating material and being substantially semi-circular in cross section, one of said sections having a longitudinal groove arcuate in cross section upon one side thereof and the other of said sections having a longitudinal arcuate rib complemental to the said groove, the inner ends of the sections being open while the outer ends thereof are completely closed, and normally open spring hinges connecting the said sections together.

2. An auxiliary handle comprising two sections of heat insulating material substantially semi-circular in cross section and being rounded at one end and squared at the other end, one of the said sections being provided with a longitudinal groove arcuate in cross section upon its plane side opening at the squared end thereof and closed at the rounded end of the section, the other of said sections being provided with a longitudinal arcuate rib upon its plane side formed complementally with respect to the said groove and normally open spring hinges secured between the plane faces of the said sections.

In testimony whereof I affix my signature in presence of two witnesses.

JOZEF ACHBERGER.

Witnesses:
 HUGH KING,
 FRED ROST.